US012524271B2

(12) United States Patent
Nambi

(10) Patent No.: US 12,524,271 B2
(45) Date of Patent: Jan. 13, 2026

(54) SHARED RESOURCE ACCESS

(71) Applicant: Hewlett Packard Enterprise Development LP, Spring, TX (US)

(72) Inventor: Grace Priscilla Nambi, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 498 days.

(21) Appl. No.: 18/295,375

(22) Filed: Apr. 4, 2023

(65) Prior Publication Data

US 2024/0248758 A1 Jul. 25, 2024

(30) Foreign Application Priority Data

Jan. 25, 2023 (IN) .............................. 202341005161

(51) Int. Cl.
*G06F 9/50* (2006.01)
(52) U.S. Cl.
CPC .......... *G06F 9/5016* (2013.01); *G06F 9/5072* (2013.01)
(58) Field of Classification Search
CPC .............................. G06F 9/5016; G06F 9/5072
See application file for complete search history.

(56) References Cited

U.S. PATENT DOCUMENTS

| 6,934,950 | B1 | 8/2005 | Tuel, Jr. et al. |
| 8,521,780 | B2 | 8/2013 | Arora et al. |
| 8,522,290 | B2 | 8/2013 | Chakrabarti et al. |
| 8,793,691 | B2 | 7/2014 | Devadhar |
| 8,914,898 | B2 | 12/2014 | Tharakan |
| 10,235,223 | B2 | 3/2019 | Prasad et al. |
| 10,567,250 | B2 | 2/2020 | Droux et al. |
| 2014/0181312 | A1 | 6/2014 | Rutten et al. |
| 2017/0060437 | A1* | 3/2017 | Schuster ............... G06F 3/0652 |
| 2017/0060706 | A1* | 3/2017 | Kinoshita ........... G06F 11/1666 |
| 2018/0074969 | A1* | 3/2018 | Neiger ............... G06F 12/1009 |
| 2019/0306282 | A1* | 10/2019 | Masputra ............. H04L 69/321 |
| 2020/0081858 | A1 | 3/2020 | Philmore et al. |
| 2025/0068332 | A1* | 2/2025 | Wang ................... G06F 3/0673 |
| 2025/0123881 | A1* | 4/2025 | Sankaran ............. G06F 9/3858 |

FOREIGN PATENT DOCUMENTS

WO 2018/100477 A1 6/2018

* cited by examiner

*Primary Examiner* — Sisley N Kim
(74) *Attorney, Agent, or Firm* — Hewlett Packard Enterprise Patent Department

(57) ABSTRACT

Examples described herein relate a communication management system (CMS) to manage access to a shared resource, for example, a shared memory array. Responsive to writing a data object into a memory segment at a memory index in the shared memory array for an application, the CMS may select a target application instance as a consumer of the data object. The target application instance is selected from a plurality of application instances based on the memory index and a count of application instances. The target application instance is then notified to read the memory object. The selection of the target application instance to read the data object based on the memory index and the count of application instances avoids data read contentions among the plurality of application instances causing faster data access by the application.

20 Claims, 7 Drawing Sheets

SHARED RESOURCE ACCESS

BACKGROUND

Cloud infrastructures, such as public clouds and private clouds (hereinafter commonly referred to as a cloud), have gained immense popularity, especially due to benefits such as high availability of resources, scalability, as-a-service offerings, and low operating costs. In particular, the scalability offered by modern clouds may allow a user to scale up or down the amount of data and/or number of applications to support changing business demands and objectives. For instance, to meet increasing demands for faster execution of tasks, data reliability, managing higher traffic rates, and managing an increased number of users, applications are deployed at a scale on the cloud. For example, several instances of an application may be deployed to run simultaneously for faster completion of tasks and to manage higher traffic rates and the increased number of users, thereby achieving higher overall performance.

While several application instances can run simultaneously, the clouds may also optimize resource utilization for the application by sharing cloud resources among the application instances. For example, in clouds, an application may be allocated resources such as compute, storage, and/or networking systems that may be shared by several of the application instances. For example, a common memory array of a predefined size may be allocated to the application which may serve as an input buffer for the application. Any data directed to the application may be stored in such a shared memory array. One or more of the application instances may read the data from the shared memory array. Therefore, it is particularly useful for the application instances to efficiently access such a shared resource (e.g., the shared memory array) to benefit from the scaling.

As the resources are shared among the application instances, it is possible that more than one application instance may try to consume the shared resources simultaneously. Such simultaneous resource consumption requests for the shared resource may cause data contentions among the application resources that may degrade the performance of the application. Also, depending on the usage requirements, additional application instances may be deployed, or some application instances may be removed. Such dynamic changes in the application instances may also lead to ineffective utilization of shared resources.

BRIEF DESCRIPTION OF THE DRAWINGS

Features, aspects, and advantages of the present specification will become better understood when the following detailed description is read with reference to the accompanying drawings in which like characters represent like parts throughout the drawings.

Figure 1A:
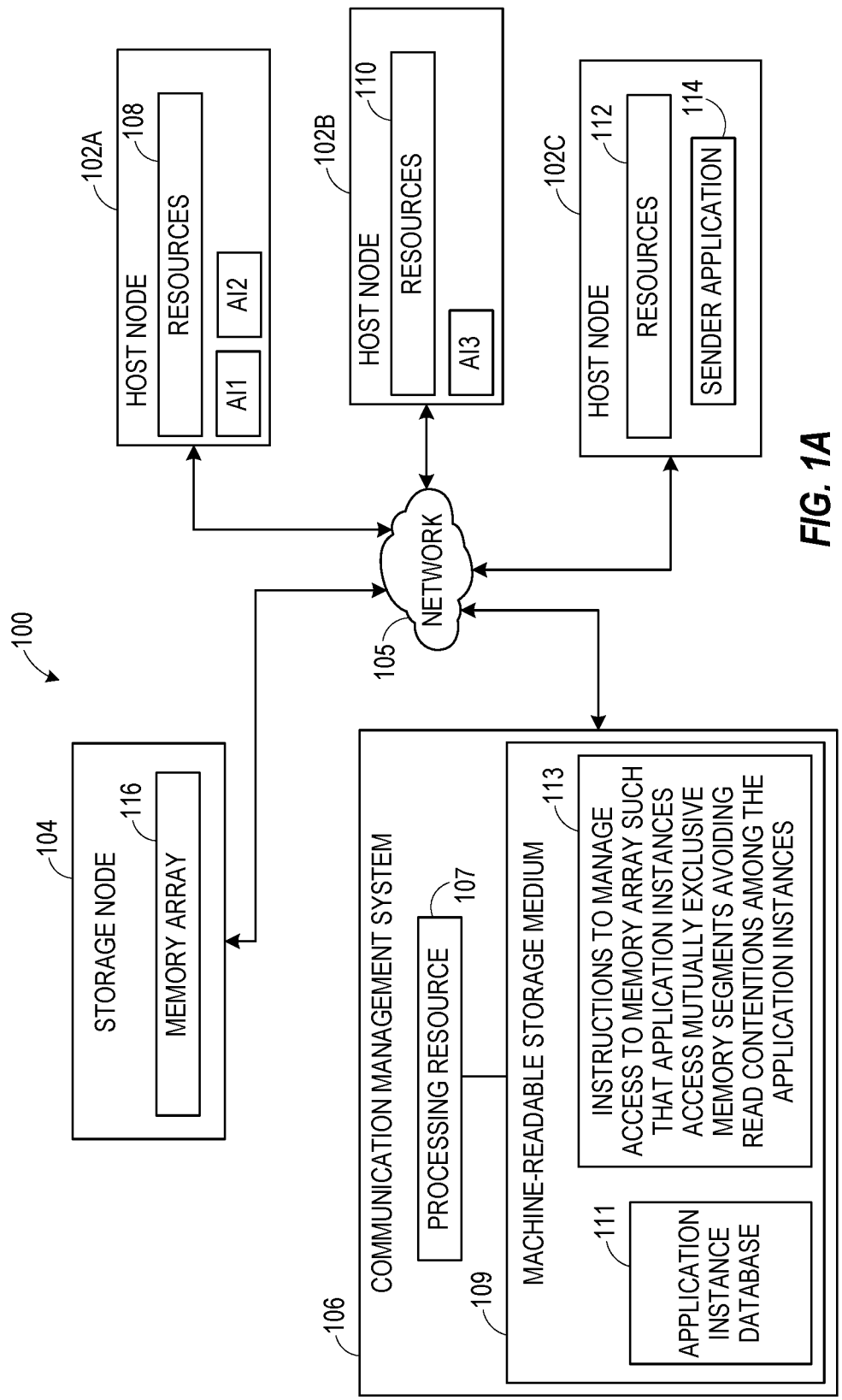
FIG. 1A depicts an example system for managing access to a shared resource, for example, a shared memory, array allocated to an application.

It is emphasized that, in the drawings, various features are not drawn to scale. In fact, in the drawings, the dimensions of the various features have been arbitrarily increased or reduced for clarity of discussion.

DETAILED DESCRIPTION

In implementations where application instances share resources, for example, a memory array to read and write data, there are chances that more than one application instances attempt to access the same memory segment of a such shared memory array simultaneously. This may result in possibilities of deadlocks and cloud contentions due to improper resource access by the application instances. Such simultaneous attempts to access the same memory segment may degrade the performance of the application as such contentions needs to be resolved before granting access to the requested memory segment.

One commonly known solution to minimize deadlocks caused by simultaneous read/write requests is to restrict access to the entire shared memory array for other application instances while one application instance is accessing the storage. As it is understood, this may result in an increased read time because other application instances may have to wait for their turn to read, causing the performance of the application to degrade due to increased read times.

In another commonly known solution to minimize the frequency or chances of contentions among the application instances, contention scenarios are manually analyzed and a root cause for such contentions is identified, followed by implementing corrective actions. While such manual checks may address specific problem scenarios to a certain extent but fail to eliminate chances of contentions. Moreover, such manual interventions are generally labor-intensive and are not cost-effective. Furthermore, any additional scaling (e.g., scale-up or scale-down) of the application instances may entail reprogramming the shared resource management and/or reconfiguring implemented corrective measures, if any. This further adds to the complexity of managing shared resource access.

To solve this issue, a proposed example communication management system consistent with the teachings of this disclosure, efficiently manages the usage of a shared resource, for example, a memory array that is shared among a plurality of application instances of an application. In particular, the communication management system enables the application instances to access the shared memory array without contention. This is achieved, at least in part, by allowing each application instance to access memory segments at mutually exclusive memory indexes (e.g., memory addresses) dynamically based on the count of application instances. In particular, target application instances are allowed to read the shared memory array such that no two application instances may have access to a common memory segment. This eliminates contentions among the application instances to read the common memory segment. In particular, the communication management system may dynamically select a single application instance that can read a particular memory segment based on the memory index of the memory segment and a count of application instances. The consideration of the count of application instances in selecting the application instance that reads the memory segment overcomes the challenges associated with the real-time scaling of the application instances avoiding the manual reconfigurations of the known solutions.

As will be appreciated, the selection of the target application instance to read the data object based on the first memory index and the count of the plurality of application instances avoids data read contentions among the plurality of application instances causing faster data access by the application. In particular, in the proposed selection of the target application instance, each application instance access unique memory indexes, as such no two application instance may have access to the same memory segment. Accordingly, no locks are needed to read data objects for any of the application instances of the same application. This results in increased data access speeds and higher overall application performance.

Turning now to FIG. 1A, an example system 100 for managing access to a shared resource, for example, a shared memory array is presented. The system 100 is a networked system including one or more host nodes, for example, host nodes 102A, 102B, and 102C; a storage node 104; and a communication management system (CMS) 106. In some examples, one or more of the host nodes 102A-102C, the storage node 104, or the CMS 106 may be deployed in a private cloud or a public cloud. The CMS 106 is connected to the host nodes 102A-102C and the storage node 104 via a network 105. In certain examples, the CMS 106 may be deployed on any of the host nodes 102A-102C or the storage node 104. Further, although the system 100 is shown to include three host nodes 102A-102C, the use of any number of host nodes is also envisioned within the purview of the present disclosure.

The system 100 may be a distributed system where the host nodes 102A-102C, the storage node 104, and the CMS 106 may be located at physically separate locations (e.g., on different racks, on different enclosures, in different buildings, in different cities, in different countries, and the like) while being connected via the network 105. In certain other examples, the system 100 may be a turnkey solution or an integrated product. In some examples, the terms "turnkey solution" or "integrated product" may refer to a ready-for-use packaged solution or product where host nodes 102A-102C, the storage node 104, the CMS 106, and the network 105 are all disposed within a common enclosure or a common rack. Moreover, in some examples, the system 100 in any form, be it the distributed system, the turnkey solution, or the integrated product, may be capable of being reconfigured by adding or removing host nodes and/or by adding or removing internal resources (e.g., compute, storage, network cards, etc.) to and from the host nodes 102A-102C, the storage node 104, and the CMS 106.

The host nodes 102A-102C, the storage node 104, and the CMS 106 are communicatively coupled to each other via the network 105. Examples of the network 105 may include, but are not limited to, an Internet Protocol (IP) or a non-IP-based local area network (LAN), a wireless LAN (WLAN), a metropolitan area network (MAN), a wide area network (WAN), a storage area network (SAN), a personal area network (PAN), a cellular communication network, a Public Switched Telephone Network (PSTN), and the Internet. In some examples, the network 105 may include one or more network switches, routers, or network gateways to facilitate data communication. Communication over the network 105 may be performed in accordance with various communication protocols such as but not limited to, Transmission Control Protocol and Internet Protocol (TCP/IP), User Datagram Protocol (UDP), IEEE 802.11, and/or cellular communication protocols. The communication over the network 105 may be enabled via wired (e.g., copper, optical communication, etc.) or wireless (e.g., Wi-Fi®, cellular communication, satellite communication, Bluetooth, etc.) communication technologies. In some examples, the network 105 may be enabled via private communication links including, but not limited to, communication links established via Bluetooth, cellular communication, optical communication, radio frequency communication, wired (e.g., copper), and the like. In some examples, the private communication links may be direct communication links between the host nodes 102A-102C, the storage node 104, and the CMS 106.

Each of the host nodes 102A-102C may be a device including a processor, microcontroller, storage devices, and/or any other electronic component, or a device or system that may facilitate various compute and/or data storage services. Examples of the host nodes 102A-102C may include a desktop computer, a laptop, a smartphone, a server, a computer appliance, a workstation, a storage device, and the like. The host nodes 102A-102C may have similar or varying hardware and/or software configurations. By way of example, while some host nodes may have high-performance compute capabilities, some host nodes may facilitate strong data security, some host nodes may facilitate low-latency data read and/or write operations, certain host nodes may have enhanced thermal capabilities, some host nodes may be good at handling database operations, some host nodes may be good at handling graphics processing operations, or some host nodes may be better at storing a large amount of data. In certain other examples, all of the host nodes 102A-102C may have similar hardware and/or software configurations.

The host nodes 102A-102C facilitate resources, for example, compute, storage, graphics, and/or networking capabilities, for one or more application instances, for example, application instance (AI) 1, AI2, AI3, a sender application, to execute thereon. In the example of FIG. 1A, the host nodes 102A, 102B, and 102C are configured with resources 108, 110, and 112, respectively. In some examples, the resources 108, 110, and 112 may include CPUs, GPUs, storage devices, and/or network ports that may allow the application instances to function.

The term "application" or "application instance" as used herein may refer to any computer program or set of instructions that execute on the host nodes. Typically, the application" or "application instances" include a set of executable instructions to perform one or more tasks. For illustration purposes, in the example of FIG. 1A, the host node 102A is shown to host the application instance AI1 and AI2, the host node 102B is shown to host the application instance AI3, and the host node 102C is shown to host the sender application 114. The number of application instances that can be hosted on any host node may depend on the number of resources in the respective host nodes and/or high-availability policies. It is to be noted that the scope of the present disclosure is not construed to be limited to the type, use, functionalities, and/or features offered by the applications hosted on the host nodes 102A-102C.

The application instances AI1, AI2, and AI3 may be instances of the same application running in a scaled form. For example, the AI1 and AI2 are the same application running simultaneously on the host node 102A. In some examples, the application instances may execute directly via an operating system running on the host nodes 102A-102C. In certain examples, the application instances may run via virtual computing systems, for example, containers, virtual machines, and pods executing on the host nodes 102A-102C. In such an implementation, the host nodes 102A-102C may be configured with respective virtual computing management systems, for example, hypervisors, container runtime, and the like, to run the virtual computing systems such as virtual machines, containers, or pods.

The storage node 104 may be an example representative of the host nodes 102A-102C and provides storage space to host data for several applications running on the host nodes 102A-102C, for example. In the example of FIG. 1A, the storage node 104 stores a memory array 116 that is dedicated for use by an application executing via the application instances AI1-AI3. In particular, all the application instances (e.g., the AI1-AI3) of the application may use the memory array 116 for storing and/or retrieving data during the execution of the application instances. In certain other examples, the memory array 116 may be hosted on any of the host nodes 102A-102C.

Figure 1B:
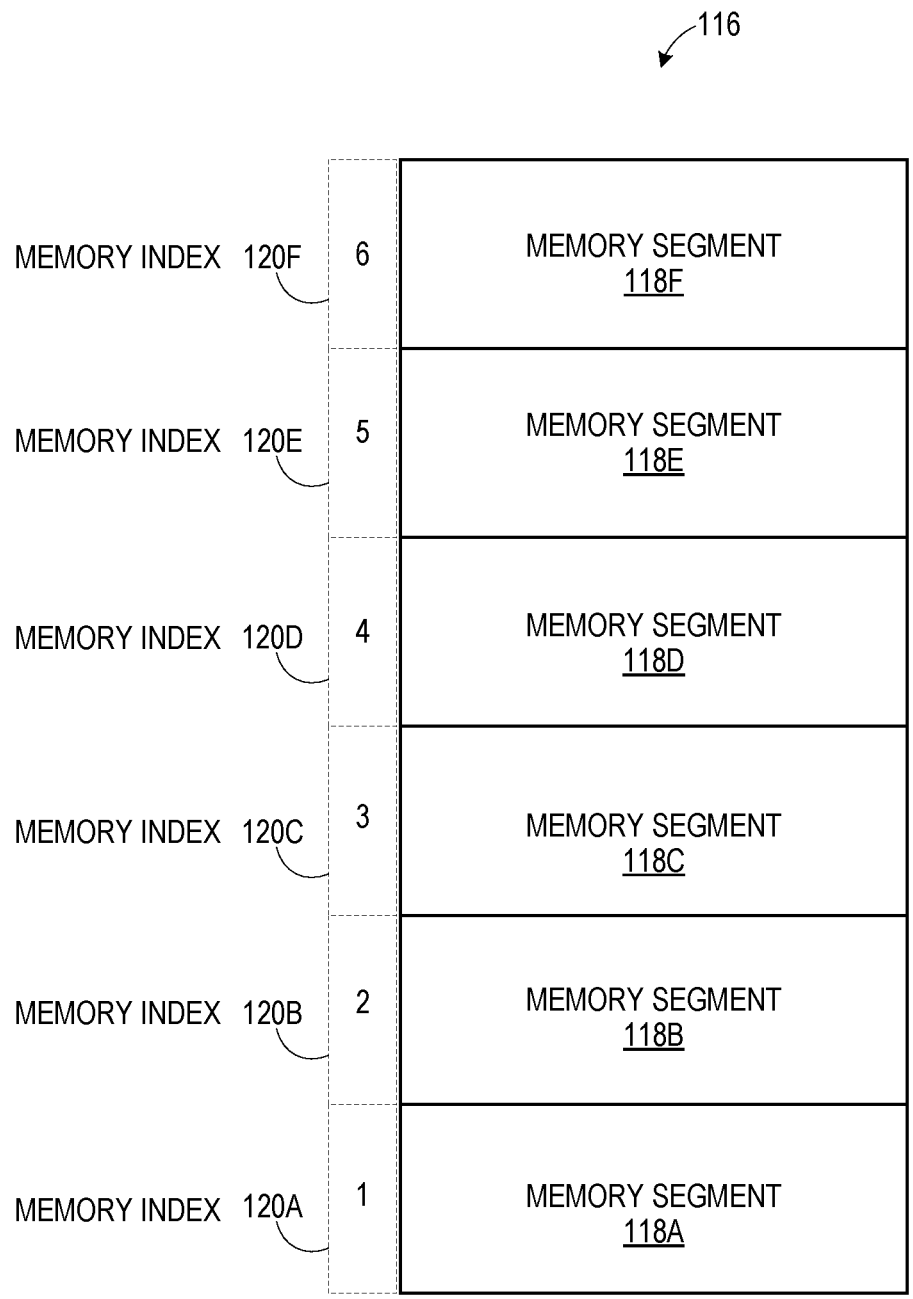
FIG. 1B depicts a block diagram of a shared memory array deployed in the system of FIG. 1A.

Additional details of the memory array 116 are described in conjunction with FIG. 1B. For continuity of description FIG. 1B is described concurrently with FIG. 1A. Referring now to FIG. 1B, an example illustration of the memory array 116 is depicted. The memory array 116 may be formed of several memory segments. For illustration purposes, in FIG. 1B, the memory array 116 is shown to include 6 memory segments 118A, 118B, 118C, 118D, 118E, and 118F (hereinafter collectively referred to as memory segments 118A-118F). Each of the memory segments 118A-118F may be a storage unit of a predefined size (e.g., 8 bits or any other size) and may be used to store data objects. Each of the memory segments 118A-118F may be referenced by its unique index, hereinafter referred to as a memory index. For example, the memory segments 118A, 118B, 118C, 118D, 118E, and 118F may be addressed via memory indexes 120A, 120B, 120C, 120D, 120E, and 120F, respectively. The memory index may be represented as a unique address of the memory segment, or a relative distance from a base memory segment. In the ongoing description, the memory index for each memory segment is represented as a relative distance from a base memory segment 118A. Accordingly, the memory indexes 120A, 120B, 120C, 120D, 120E, and 120F may be 1, 2, 3, 4, 5, and 6, respectively, as depicted in FIG. 1B.

In some examples, the CMS 106 may aid in efficiently managing the usage of a shared resource, for example, the memory array 116 that is shared among the plurality of application instances 102A-102C such that chances of read/write contentions among the application instances AI1-AI3 may be avoided. In some examples, the CMS 106 may be implemented as hardware including a processor or microcontroller and/or any other electronic component, or a device or system that may facilitate various compute and/or data storage services, for example, and/or in particular, the management of the memory array 116. Examples of the CMS 106 may include, but are not limited to, a desktop computer, a laptop, a smartphone, a server, a computer appliance, a workstation, a storage system, or a converged or hyperconverged system, and the like that is configured to control access of the usage of the memory array 116.

In some examples, as depicted in FIG. 1, the CMS 106 includes a processing resource 107 and a machine-readable storage medium 109. The machine-readable storage medium 109 may be non-transitory and is alternatively referred to as a non-transitory machine-readable storage medium 109. The machine-readable storage medium 109 may be any electronic, magnetic, optical, or any other storage device that may store data and/or executable instructions. Examples of the machine-readable storage medium 109 may include Random Access Memory (RAM), non-volatile RAM (NVRAM), an Electrically Erasable Programmable Read-Only Memory (EEPROM), a storage drive, a solid-state drive, a hard-disk drive (e.g., magnetic disk), a flash memory device, a compact disc read-only memory (CD-ROM), and the like.

The machine-readable storage medium 109 may store data and/or instructions. For example, the machine-readable storage medium 109 may store an application instance database 111 that includes information about the active application instances running on the host nodes 102A-102C. In some examples, the application instances AI1, AI2, and AI3 are assigned identifiers (hereinafter referred to as application identifiers), for example, 1, 2, and 3 respectively. The CMS 106, in the machine-readable storage medium 109, may maintain the application instance database 111 that includes information about the active application instances and respective application identifiers. The CMS 106 may, periodically or at each data write operation, monitor the application instances and update the application instance database 111 to reflect instantaneous details on the active application instances. Table-1 represented below depicts an example content of the application instance database.

TABLE 1

Example content of the application instance database 113

| Application Instance | Instance Identifier |
|---|---|
| AI1 | 1 |
| AI2 | 2 |
| AI3 | 3 |

Further, the machine-readable storage medium 109 may store instructions 113 for performing one or more of the operations to manage access to the shared memory array 116 such that application instances access mutually exclusive memory segments of the memory array 116 avoiding read contentions among the application instances AI1-AI3.

The processing resource 107 may include one or more central processing units (CPUs), semiconductor-based microprocessors, and/or other hardware devices suitable for retrieval and execution of instructions 113 stored in a machine-readable storage medium 109. The processing resource 107 may fetch, decode, and execute instructions 113, to manage read access for the shared resource, for example, a shared memory array 116. As an alternative or in addition to retrieving and executing instructions 113, the processing resource 107 may include one or more electronic circuits that include electronic components, such as a field-programmable gate array (FPGA), an application-specific integrated circuit (ASIC), or other electronic circuits for performing the functionality of one or more instructions 113. In some examples, the CMS 106, by way of the processing resource 107 executing the instructions 113, may perform operations described in one or more of FIGS. 2, 3A-3B, and 4 by way of executing one or more of the instructions 113.

Further, in certain examples, the CMS 106 may be implemented as a virtual machine or a containerized application executing on hardware in the system 100. In one example, the CMS 106 may be implemented as a virtual machine or a containerized application on any of the host nodes 102A-102C or the storage node 104. The CMS 106 may be subscribed by a user on a pay-per-use basis for managing access to the memory array 116. The user may be able to securely access the CMS 106 via a cloud management platform which may be facilitated and managed by the cloud service provider. In some examples, when the CMS 106 is implemented as a virtual resource (e.g., a VM, a container, or a software application), the processing resource 107 and the machine-readable storage medium 109 may respectively represent a processing resource and a machine-readable storage medium of a host machine hosting the CMS 106 as the virtual resource.

The CMS 106 may allow the application instances AI1-AI3 to access the shared memory array 116 without contention by way of the processing resource 107 executing the instructions 113, for example. This is achieved, at least in part, by allowing each of the application instances AI1-AI3 to access memory segments at mutually exclusive memory indexes (e.g., memory addresses) dynamically based on the count of application instances. In particular, whenever a data object is written into a memory segment of the memory array 116, the CMS 106 selects one of the application instances AI1-AI3 as a target application instance that can read the data object. The CMS 106 makes this selection of the target application instance based on the memory index of the memory segment in which the data object is written and an instantaneous count of application instances.

Once the target application instance is selected, the target application is notified to read the data object. This way, no two application instances will have access to the same memory segment. This eliminates contentions among the application instances to read the common memory segment. Accordingly, no locks are needed to read data objects for any of the application instances of the same application. This results in increased data access speeds and higher overall application performance. Further, the consideration of the count of application instances in selecting the application instance that reads the memory segment overcomes the challenges associated with the real-time scaling of the application instances avoiding the manual reconfigurations of the known solutions. Details of the operations performed by the CMS 106 to control access of the shared memory array 116 are described in conjunction with FIGS. 2, 3A-3B, and 4.

Figure 2:
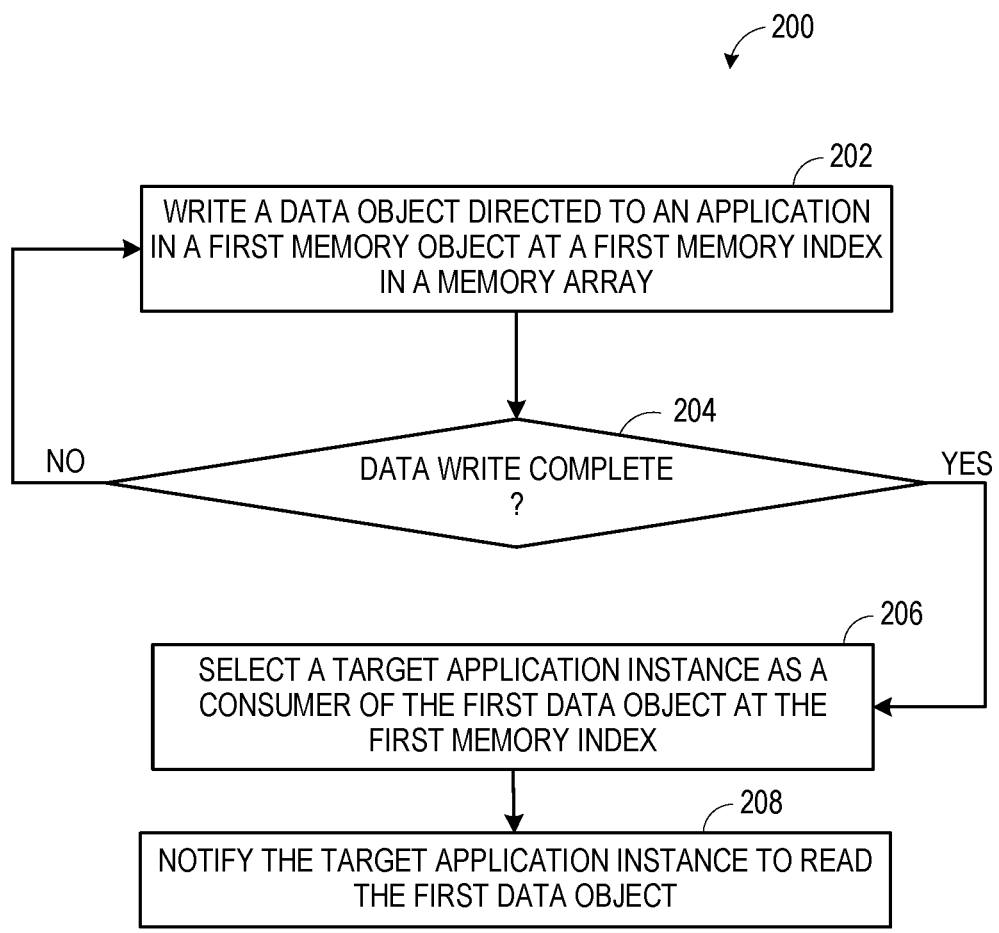
FIG. 2 depicts a flow diagram of an example high-level method for allowing access to a shared memory array.

Referring now to 2, a flow diagram of an example high-level method 200 for allowing access to a shared memory array, for example, the memory array 116 is presented. The method 200 may include several operations which may be performed by the CMS 106. In certain examples, one or more of these operations may be performed by the processing resource by executing one or more of the instructions stored in the machine-readable storage medium. Certain details of the operations have already been described in conjunction with FIG. 1A-1B, which are not repeated herein for the sake of brevity. For ease of illustration, the method 200 of FIG. 2 is described in conjunction with FIGS. 1A-1B. However, details and/or examples presented herein should not be construed to be limited by the specifics of FIGS. 1A-1B.

At block 202, the CMS 106 writes a first data object into a memory segment in the memory array 116. The first data object may be received from any application, for example, the sender application 114 hosted on the host node 102C. In some examples, the first data object may be a portion of a message received from the sender application 114 and directed to the receiver application. On receipt of the first data object, the CMS 106 may first ascertain (e.g., based on destination/target address in the first data object) whether the first data object is directed to the receiver application executed in the form of the application instances AI1-AI3. If the first data object is found directed to the receiver application, the CMS 106 may choose to write the data object into the memory array 116 that is assigned for the dedicated use by the receiver application. Then, the CMS 106 may identify the lowest free memory index and write the first data object into the memory segment associated with such free memory index. For example, if the memory segments 118B, 118C, and 118D are empty, the CMS 106 may identify the memory segment 118B as the first memory segment because its memory index is the lowest among the empty memory segments.

At block 204, the CMS 106 performs a check to determine if the first data object is successfully written. At block 204, if it is determined that the first data object is not successfully written, the CMS 106 continues to write the first data object. However, at block 204, if it is determined that the first data object is successfully written, at block 206, the CMS 106 selects a first target application instance as a consumer of the first data object at the first memory index. The memory index at which the first data object is written at block 202 (hereinafter referred to as a source memory index). In particular, the first target application instance may be selected from the plurality of application instances based on the first memory index and a first count of application instances. The first count of application instances may refer to an instantaneous count of application instances at the time of executing block 206 after writing the first data object.

In one example, if the source memory index is smaller than the first count of application instances, the application instance having an application identifier the same as the current memory index is selected as the first target application instance. For example, if the first count of application instances is 3 and the source memory index is "1" (e.g., the first data object is written on the memory segment 118A), the CMS 106 may select the application instance with the application instance identifier "1" (e.g., the application instance AI1) as the first target application instance that can consume/access the first data object written on the first memory segment 118A.

Further, if the source memory index is greater than the first count of application instances, the CMS 106 may determine the first target application instance using the relationship of equation (1).

$$TAII_i = SMI \; \% \; C_i \qquad \text{Equation (1)}$$

where TAII represents a target application instance identifier, SMI represents the source memory index, and FC represents the count of application instances. In Equation (1), for the determination of the first target instance, the value of i is 1. Accordingly, $TAII_i$ represents a first target application instance identifier, and $C_i$ represents the first count of application instances. Further, the sign "%" in Equation (1) represents a modulo operation that results in a remainder as the output as an outcome of dividing the source memory index by the count of application instances. By way of example, if the source memory index at which the first data object is written is 5 (e.g., representing the memory segment 118D) and the first count of application instances is 3, the value of SMI % $C_i$ would be 2. Accordingly, the CMS 106 may select the application instance with the application instance identifier "2" (e.g., the application instance AI2) as the first target application instance that can consume/access the first data object written on the first memory segment 118A.

Further, if the value of SMI % $C_i$ is zero, the CMS 106 may select the application instance having its identifier equal to the first count of application instances (e.g., 3 in the present example). In particular, the value of SMI % $C_i$ is zero when the source memory index is a multiple of the first count of application instances. For example, if the source memory index is 6 (SMI % $C_i$=0), the CMS 106 may select an application instance having the application instance identifier 3 (=equal to the first count of application instances) as the target application instance. In this example, the application instance AI3 will be selected as the first target application instance.

Once, the first target application instance is selected, the CMS 106, at block 208, notifies the first target application instance to read the first data object. The CMS 106 may send the notification to the target application instance via one or more APIs.

As will be appreciated, the selection of a single target application instance to read the data object written on a given memory segment based on the respective memory index and the count of application instances avoids data read contentions among the plurality of application instances causing faster data access by the application. In particular, in the proposed selection of the target application instance, each application instance access unique memory indexes, as such no two application instance may have access to the same memory segment.

Accordingly, no locks are needed to read data objects for any of the application instances of the same application. This results in increased data access speeds and higher overall application performance.

Figure 3A:
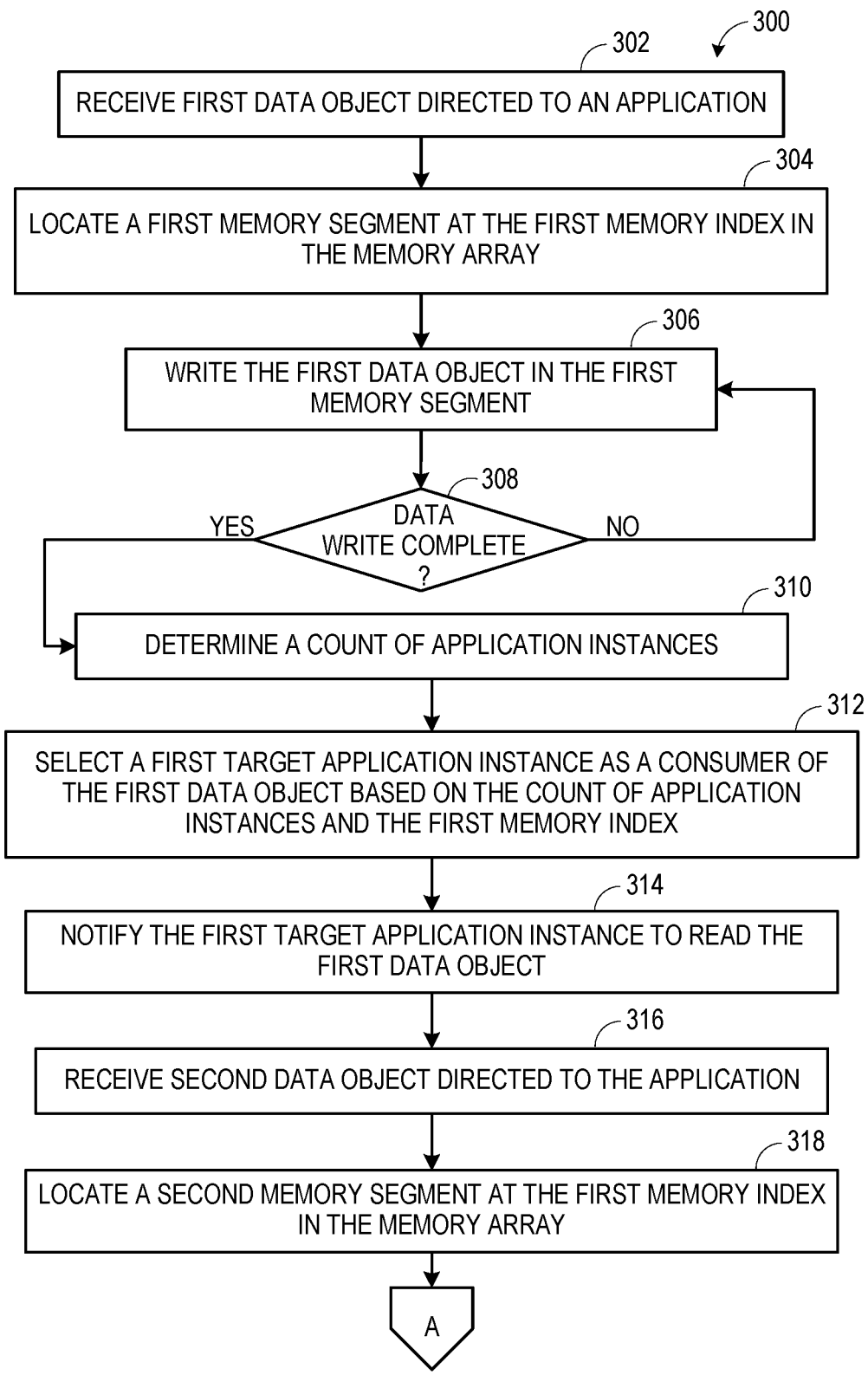
FIGS. 3A and 3B collectively depict a flow diagram of an example detailed method for allowing access to a shared memory array.
Figure 3B:
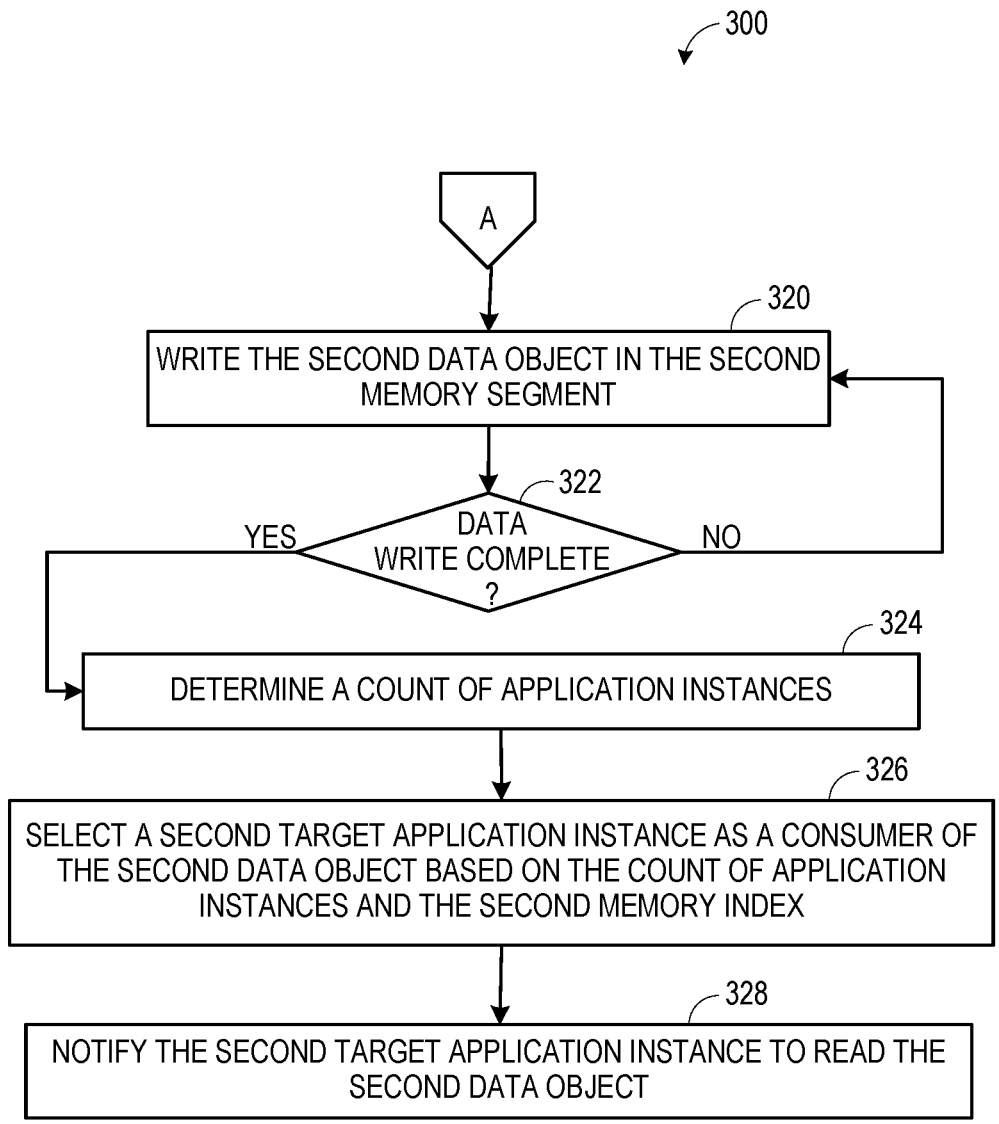

Referring now to FIGS. 3A and 3B, a flow diagram of an example detailed method 300 for allowing access to a shared memory array is presented. The method 300 may include several operations, one or more of which may be performed by the CMS 106. The method 300 is an example representative of the method 200 of FIG. 2 and may include certain additional details and/or additional blocks than described in FIG. 2. For ease of illustration, the method 300 is described in conjunction with FIGS. 1A-1B. However, details and/or examples presented herein should not be construed to be limited by the specifics of FIGS. 1A-1B. Moreover, certain details of the operations in method 300 have already been described in conjunction with FIGS. 1A-1B and 2, which are not repeated herein for the sake of brevity.

At block 302, the CMS 106 receives a first data object which is directed to a receiver application that is executing on the host nodes 102A-102C via application instances AI1-AI3. The first data object may be sent from the sender application 114 to the receiver application. Further, at block 304, the CMS 106 identifies a first memory segment at the first memory index in the memory array 116 to store the first data object. In particular, at block 304, the CMS 106 may identify the lowest memory index at which the memory segment is free. For example, if the memory segments 118B, 118C, and 118D are empty, the CMS 106 may identify the memory segment 118B as the first memory segment because its memory index is the lowest among the empty memory segments. Once the first memory segment is identified, at block 306, the CMS 106 writes the first data object in the first memory segment.

At block 308, the CMS 106 performs a check to determine if the first data object is successfully written. At block 308, if it is determined that the first data object is not successfully written, the CMS 106 continues to write the first data object. However, at block 308, if it is determined that the first data object is successfully written, at block 310, the CMS 106 determines a first count of application instances. The first count of application instances is the count of application instances that are in active state (i.e., which are not suspended or terminated). To determine the first count of application instances, in one example, the CMS 106 may poll the application instances to see which ones are active. In another example, the CMS 106 may maintain a database of active application instances and use this information to determine the number of active application instances at any given time.

Further, at block 312, the CMS 106 selects a first target application instance as a consumer of the first data object at the first memory index, in a similar fashion as described in conjunction with FIG. 2. Once, the first target application instance is selected, the CMS 106, at block 314, notifies the first target application instance to read the first data object. The CMS 106 may send the notification to the target application instance via one or more APIs.

Furthermore, during the operation of the CMS, at block 316, receives additional data objects, for example, a second t data object which is directed to the receiver application that is executing in the form of application instances AI1-AI3. The second data object may be sent from the sender application 114 (or any other application, not shown in FIG. 1A) to the receiver application. In some examples, the second data object may be a portion of the same message as that of the first data object or another message received from the sender application 114 and directed to the receiver application.

Further, at block 318, the CMS 106 identifies a second memory segment at the second memory index in the memory array in a similar fashion as described with reference to block 304. Once the second memory segment is identified, at block 320, the CMS 106 writes the second data object in the second memory segment. Further, similar to block 308, at block 322, the CMS 106 performs another check to determine if the second data object is successfully written. At block 322, if it is determined that the second data object is not successfully written, the CMS 106 continues to write the second data object. However, at block 322, if it is determined that the second data object is successfully written, at block 324, the CMS 106 determines a second count of application instances. The second count of application instances is an instantaneous count of application instances that are in active state (i.e., which are not suspended or terminated). The second count of application instances may be the same or different from the first count of application instances.

Further, at block 326, the CMS 106 selects a second target application instance as a consumer of the second data object at the second memory index, in a similar fashion as described in conjunction with FIG. 2. Once, the second target application instance is selected, the CMS 106, at block 328, notifies the second target application instance to read the second data object. The CMS 106 may send the notification to the target application instance via one or more APIs.

As described in method 300, for two different memory segments, the CMS 106 may select different application instances as target application instances that can read the respective memory objects. For instance, the first target application instance is notified to read the first data object at the first memory segment, whereas the second target application instance which is different from the first target application instance is notified to read the second data object at the second memory segment. Accordingly, the first target application instance and the second target application instance may not contend to read the same memory segment, resulting in faster memory access.

Figure 4:
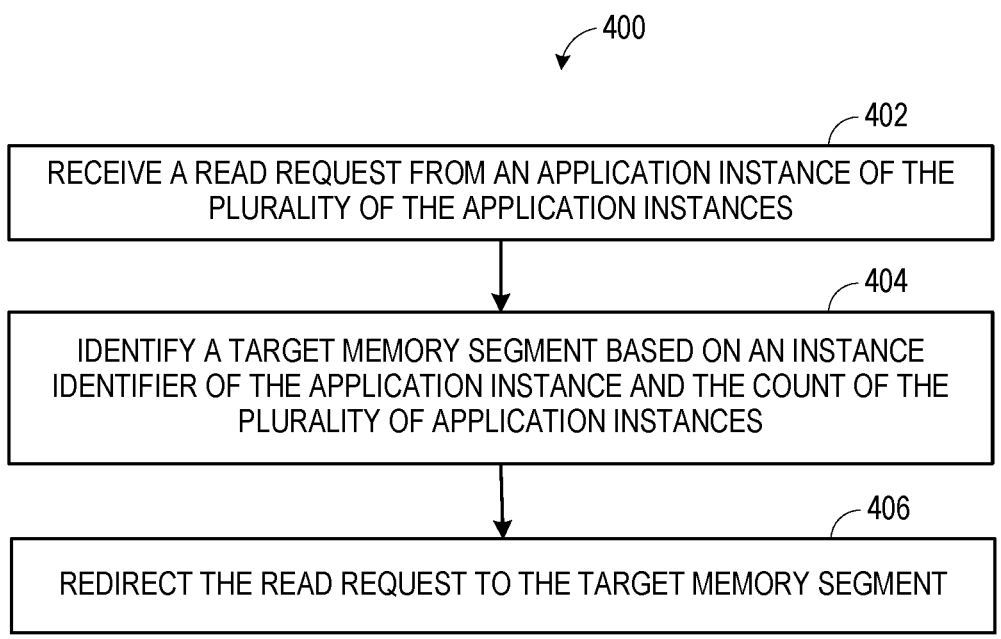
FIG. 4 depicts a flow diagram of an example method for managing read requests from application instances.

FIG. 4 depicts a flow diagram of an example method 400 for managing read requests from application instances. The method 400 may include several operations which may be performed by the CMS 106 described in FIG. 1A. In certain examples, one or more of these operations may be performed by the processing resource by executing one or more of the instructions stored in the machine-readable storage medium. For ease of illustration, the method 400 is described in conjunction with FIGS. 1A and 1B. However, details and/or examples presented herein should not be construed to be limited by the specifics of FIGS. 1A and 1B.

At block 402, the CMS 106 receives a read request from an application instance of the plurality of the application instances (AI1-AI3, for example). The CMS 106 receives such read requests via an API accessible by the application instance. The application instance that sends the read request is hereinafter referred to as a consumer application instance.

Further, at block 404, the CMS 106 may identify a target memory segment based on an instance identifier (see Table-1) of the consumer application instance and an instantaneous count of application instances. In particular, upon receiving the read request, the CMS 106 may determine the count of application instances by polling the application instances or using the application instance database, as described earlier. Further, the CMS 106 may determine a target memory index that addresses the target memory segment based on the instance identifier of the consumer application instance and an instantaneous count of application instances using a relationship of equation (2), for example.

$$TMI_j = I_{ID} + (j*C) \qquad \text{Equation (2)}$$

Where, TMI represents the target memory index, $I_{ID}$ represents the instance identifier of the consumer application instance, C represents the instantaneous count of application instances. Further, the values of j may be any of the integers, for example, 0, 1, 2, 3, and so on.

If the application instance AI1 (whose application identifier is 1) issues a read request and the instantaneous count of application instances is three, the CMS 106 may determine the target memory indexes as 1 (for, j=0) and 4 (for, j=1). Accordingly, the target memory segments for the application instance AI1 are 118A and 118D. Accordingly, if application instance AI2 (whose application identifier is 2) issues the read request and the instantaneous count of application instances is three, the CMS 106 may determine the target memory indexes as 2 (for, j=0) and 5 (for, j=1) resulting in the target memory segments for the application instance AI2 being 118B and 118E. Similarly, if application instance AI3 (whose application identifier is 3) issues the read request and the instantaneous count of application instances is three, the CMS 106 may determine the target memory indexes as 3 (for, j=0) and 6 (for, j=1) resulting in the target memory segments for the application instance AI3 being 118C and 118F.

Once the target memory segments are identified, the CMS 106, at block 406, redirects the read request to the target memory segment. As will be appreciated, no two application instances can access the same memory segment as per the described identification of the target memory segments. Accordingly, even though the memory array is shared among several application instances, the application instances will have mutually exclusive access to the respective memory segments depending on the instantaneous count of application instances.

Figure 5:
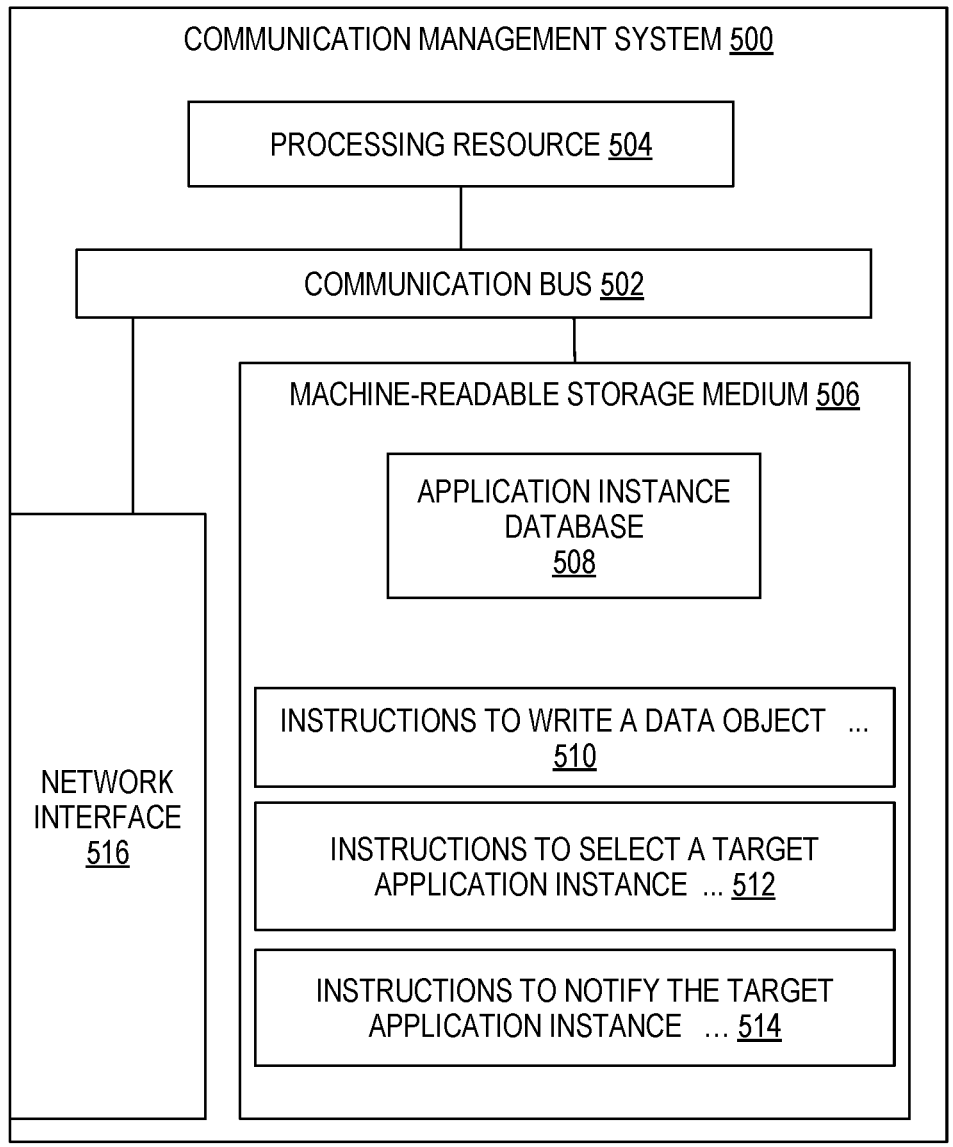
FIG. 5 depicts a block diagram of an example communication management system.

FIG. 5 depicts a block diagram of a CMS 500 in which various of the examples described herein may be implemented. In some examples, the CMS 500 may be configured to operate as the CMS 106 when deployed in the system 100 of FIG. 1 and can perform various operations described in one or more of the earlier drawings.

The CMS 500 may include a communication bus 502 or other communication mechanisms for communicating information (e.g., commands and/or data), a hardware processor, also referred to as processing resource 504, and a machine-readable storage medium 506 coupled to the communication bus 502 for processing information. The processing resource 504 and the machine-readable storage medium 506 may be example representatives of the processing resource 107 and the machine-readable storage medium 109, respectively, described in conjunction with FIG. 1A. In some examples, the machine-readable storage medium 506 may be non-transitory and is alternatively referred to as a non-transitory machine-readable storage medium 506. The machine-readable storage medium 506 may store data and/or instructions. For example, the machine-readable storage medium 506 may store an application instance database 508 which is an example representative of the application instance database 111 of FIG. 1A. The CMS 500 may, periodically or at each data write operation, monitor the application instances and update the application instance database to reflect instantaneous details (see Table-1, for example) on the active application instances. The instructions encoded in the machine-readable storage medium 506 may include instructions 510, 512, and 514 (hereinafter collectively referred to as instructions 510-514 and are example representative of the instructions 113 described in conjunction with FIG. 1A) for performing one or more of the operations described in the method 200 of FIG. 2, for example. Although not shown, in some examples, the machine-readable storage medium 506 may be encoded with certain additional executable instructions to perform one or more other operations (e.g., operations described in FIGS. 3A, 3B, and 4) performed by the CMS 106, without limiting the scope of the present disclosure.

Further, in some examples, the CMS 500 may also include a network interface 516 coupled to the communication bus 502. The network interface 516 provides a two-way data communication coupling to one or more network links that are connected to one or more networks (e.g., the network 105). For example, the network interface 516 may be an integrated services digital network (ISDN) card, cable modem, satellite modem, or a modem to provide a data communication connection to a corresponding type of telephone line. As another example, the network interface 516 may be a local area network (LAN) card or a wireless communication unit (e.g., Wi-Fi chip/module).

In some examples, the instructions 510-514 when executed by the processing resource 504 may cause the processing resource 504 to manage access to the shared memory array (e.g., the shared memory array 116). For example, the instructions 510, when executed by the processing resource 504, may cause the processing resource 504 to write a first data object directed to an application in a first memory segment at a first memory index of a memory array dedicated to the application executing in a scaled form via a plurality of application instances. Further, the instructions 512, when executed by the processing resource 504, may cause the processing resource 504 to select a first target application instance as a consumer of the first data object at the first memory index responsive to writing the first data object. In particular, the first target application instance is selected from the plurality of application instances based on the first memory index and a count of the plurality of application instances. Furthermore, the instructions 514, when executed by the processing resource 504, may cause the processing resource 504 to notify the first target application instance to read the first data object. The selection of the first target application instance to read the first data object based on the first memory index and the count of the plurality of application instances avoids data read contentions among the plurality of application instances causing faster data access by the application.

The foregoing detailed description refers to the accompanying drawings. It is to be expressly understood that the drawings are for illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. The term "based on" means based at least in part on.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

I claim:

1. A method, comprising:
    writing, by a communication management system, a first data object directed to an application in a first memory segment at a first memory index of a memory array dedicated to the application executing in a scaled form via a plurality of application instances;
    responsive to writing the first data object, selecting, by the communication management system, a first target application instance as a first consumer of the first data object at the first memory index, wherein the first target application instance is selected from the plurality of application instances based on the first memory index and a first count of application instances after writing the first data object; and
    notifying, by the communication management system, the first target application instance to read the first data object,
    wherein the selection of the first target application instance to read the first data object based on the first memory index and the first count of application instances avoids data read contentions among the plurality of application instances causing faster data access by the application.

2. The method of claim 1, further comprising determining, responsive to writing the first data object, the first count of application instances by polling the plurality of application instances.

3. The method of claim 1, further comprising:
    receiving the first data object from a sender application; and
    locating the first memory segment at the first memory index in the memory array.

4. The method of claim 3, further comprising:
    receiving, by the communication management system, a second data object directed to the application from the sender application;
    locating, by the communication management system, a second memory segment at a second memory index in the memory array, wherein the first memory index and the second memory index are mutually exclusive;
    writing, by the communication management system, the second data object in the second memory segment;
    responsive, by the communication management system, to writing the second data object, selecting, by the communication management system, a second target application instance as a second consumer of the second data object at the second memory index, wherein the second target application instance is selected from the plurality of application instances based on the second memory index and a second count of application instances after writing the first data object; and
    notifying, by the communication management system, the second target application instance to read the second data object from the second memory segment.

5. The method of claim 4, further comprising:
    receiving, by the communication management system, a read request from an application instance of the plurality of the application instances;
    identifying, by the communication management system, a target memory segment based on an instance identifier of the application instance and an instantaneous count of application instances; and
    redirecting, by the communication management system, the read request to the target memory segment.

6. The method of claim 5, wherein the application instance is the first target application instance, and the target memory segment is the first memory segment.

7. The method of claim 5, wherein the application instance is the second target application instance, and the target memory segment is the second memory segment.

8. The method of claim 1, wherein one or more of the plurality of application instances or the communication management system are deployed on a cloud.

9. The method of claim 1, wherein the communication management system is subscribed for on a pay-per-use basis.

10. The method of claim 1, wherein selecting the first target application instance comprises:
 determining a remainder by dividing the first memory index by the first count of application instances; and
 identifying the first target application instance based on the remainder.

11. A communication management system, comprising:
 a machine-readable storage medium storing instructions; and
 a processing resource coupled to the machine-readable storage medium, wherein the processing resource is configured to execute one or more of the instructions to:
  write a first data object directed to an application in a first memory segment at a first memory index of a memory array dedicated to the application executing in a scaled form via a plurality of application instances;
  responsive to writing the first data object, select a first target application instance as a first consumer of the first data object at the first memory index, wherein the first target application instance is selected from the plurality of application instances based on the first memory index and a count of the plurality of application instances; and
  notify the first target application instance to read the first data object,
  wherein selection of the first target application instance to read the first data object based on the first memory index and the count of the plurality of application instances avoids data read contentions among the plurality of application instances causing faster data access by the application.

12. The communication management system of claim 11, wherein the processing resource is further configured to execute one or more of the instructions to determine, responsive to writing the first data object, the count of the plurality of application instances by polling the plurality of application instances.

13. The communication management system of claim 11, wherein the processing resource is further configured to execute one or more of the instructions to:
 receive the first data object from a sender application; and
 identify the first memory segment at the first memory index in the memory array.

14. The communication management system of claim 13, wherein the processing resource is further configured to execute one or more of the instructions to:
 receive a second data object directed to the application from the sender application;
 identify a second memory segment at a second memory index in the memory array, wherein the first memory index and the second memory index are mutually exclusive;
 write the second data object in the second memory segment;
 responsive to writing the second data object, select a second target application instance as a second consumer of the second data object at the second memory index, wherein the second target application instance is selected from the plurality of application instances based on the second memory index and a second count of the plurality of application instances; and
 notify the second target application instance to read the second data object from the second memory segment.

15. The communication management system of claim 14, wherein the processing resource is further configured to execute one or more of the instructions to:
 receive a read request from an application instance of the plurality of the application instances; and
 identify a target memory segment based on an instance identifier of the application instance and the count of the plurality of application instances; and
 redirect the read request to the target memory segment.

16. The communication management system of claim 15, wherein the application instance is the first target application instance, and the target memory segment is the first memory segment.

17. The communication management system of claim 15, wherein the application instance is the second target application instance, and the target memory segment is the second memory segment.

18. A non-transitory machine-readable storage medium storing instructions executable by a processing resource, wherein the instructions comprise:
 instructions to write a first data object directed to an application in a first memory segment at a first memory index of a memory array dedicated to the application executing in a scaled form via a plurality of application instances;
 instructions to select a first target application instance as a first consumer of the first data object at the first memory index responsive to writing the first data object, wherein the first target application instance is selected from the plurality of application instances based on the first memory index and a first count of application instances after writing the first data object;
 instructions to notify the first target application instance to read the first data object;
 instructions to write a second data object directed to the application in a second memory segment at a second memory index in the memory array, wherein the first memory index and the second memory index are mutually exclusive;
 instructions to select a second target application instance as a second consumer of the second data object at the second memory index responsive to writing the second data object, wherein the second target application instance is selected from the plurality of application instances based on the second memory index and a second count of application instances after writing the second data object; and
 instructions to notify the second target application instance to read the second data object from the second memory segment.

19. The non-transitory machine-readable storage medium of claim 18, wherein the instructions further comprise:
 instructions to receive a read request from an application instance of the plurality of the application instances;
 instructions to identify a target memory segment based on an instance identifier of the application instance and an instantaneous count of the plurality of application instances; and
 instructions to redirect the read request to the target memory segment.

20. The non-transitory machine-readable storage medium of claim 18, wherein the instructions further comprise instructions to determine the first count of application instances and the second count of application instances by polling the plurality of application instances.

* * * * *